Figure 1:
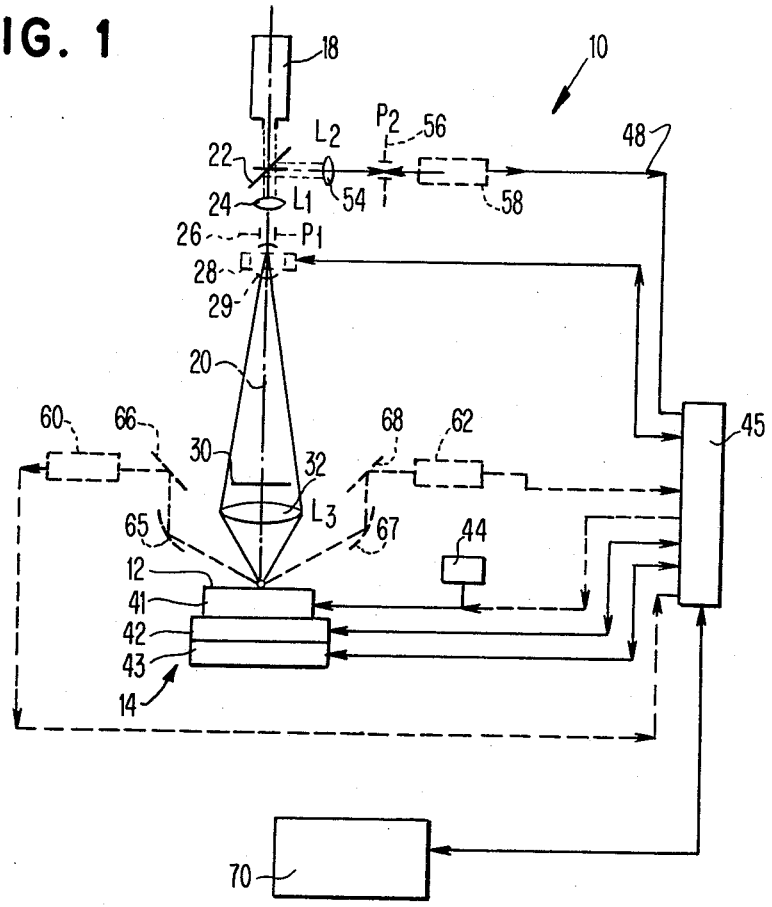
Figure 2:
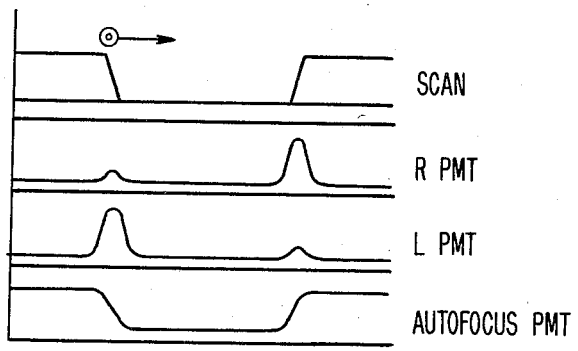
Figure 3A:
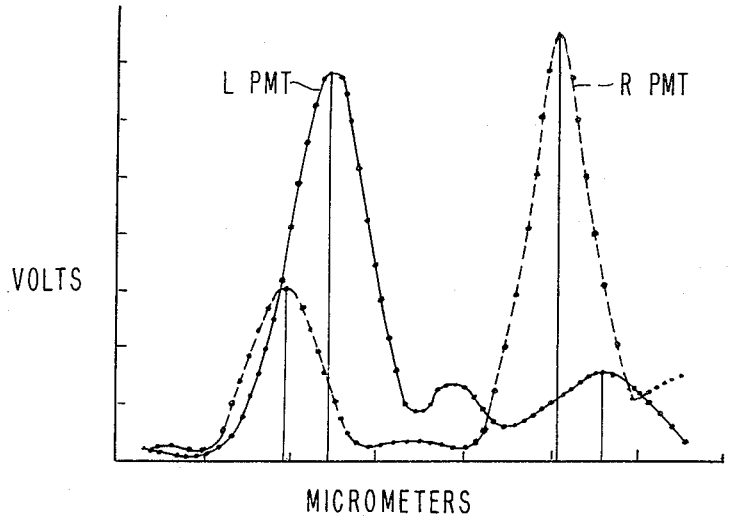
Figure 3B:
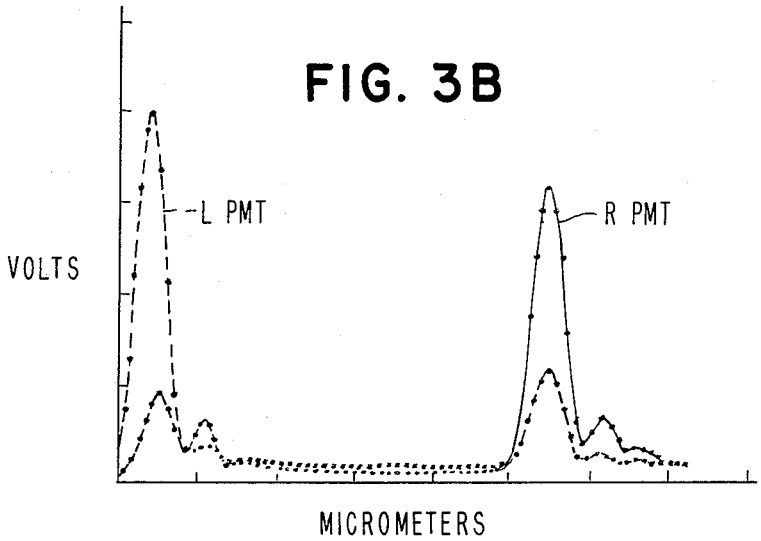
Figure 10:
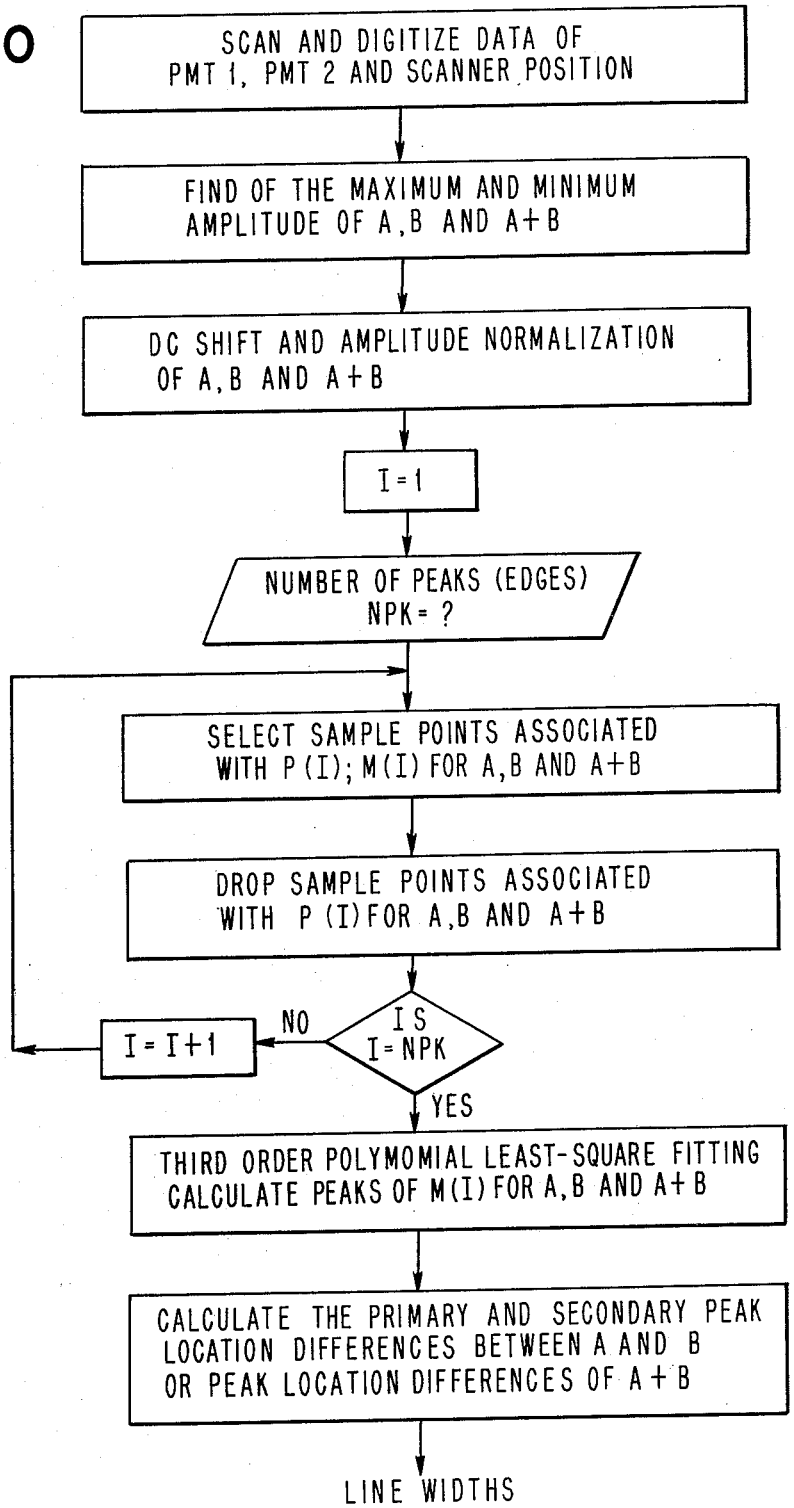

United States Defensive Publication [19] (H) [11] T102,104

Kirk et al. [43] Aug. 3, 1982

[54] SCANNING OPTICAL SYSTEM ADAPTED FOR LINEWIDTH MEASUREMENT IN SEMICONDUCTOR DEVICES

[76] Inventors: Joseph P. Kirk, Chelsea Rd., Chelsea, N.Y. 12512; Josef Predatsch, 12 Candy La., Hopewell Junction, N.Y. 12533; Lo-Soun Su, 9 Amherst La., Wappingers Falls, N.Y. 12590

[21] Appl. No.: 173,535

[22] Filed: Jul. 30, 1980

Related U.S. Application Data

[63] Continuation of Ser. No. 974,639, Dec. 29, 1978, abandoned.

[51] Int. Cl.[3] ..... G01B 11/02; G01B 11/30

[52] U.S. Cl. ..... 356/387; 356/371

[57] ABSTRACT

The present invention is directed to an optical system particularly adapted for measuring the linewidth of conductors. The particular arrangement of the various components of the optical system provide a simple system with high resolution for use in measuring very small linewidths. The optical system of the present invention utilizes a DC signal which is simpler and easier to control than an AC signal used with some optical measurement systems. More particularly, the optical system of the present invention utilizes a principle used for accurate focusing or for topographical measurements to enhance the ability of the optical system to measure small linewidths.

The optical system of the claimed invention includes a high intensity light source 18, such as a laser. Means are provided for defining and focusing a spot of the light source upon a surface 12 having features to be measured. The spot defining and focusing means include in sequence between the light source and the surface, a first lens 24, an aperture 26 and a second lens 32. The arrangement of the first and second lenses and the aperture is such that the light source is focused at the aperture by the first lens to provide a spot and the spot is focused on the surface 12 by the second lens. With this arrangement, the surface is located at the focal point of the second lens so that reflected light is refocused back in the plane of the aperture. The system further includes scanning means for selectively moving the spot across the surface to encounter the features to be measured. Light collection means 60, 62 are positioned proximate to the surface for detecting varying levels of light reflected from the surface as the spot is scanned over the edges of the features of interest. An electrical DC output is produced in response to the scanning. Means are provided for analyzing the output of the light sensitive means for providing high accuracy measurements of the distance between the detected edges of the features scanned by the spot.

1 Claim, 3 Sheets Drawing,

18 Pages Specification

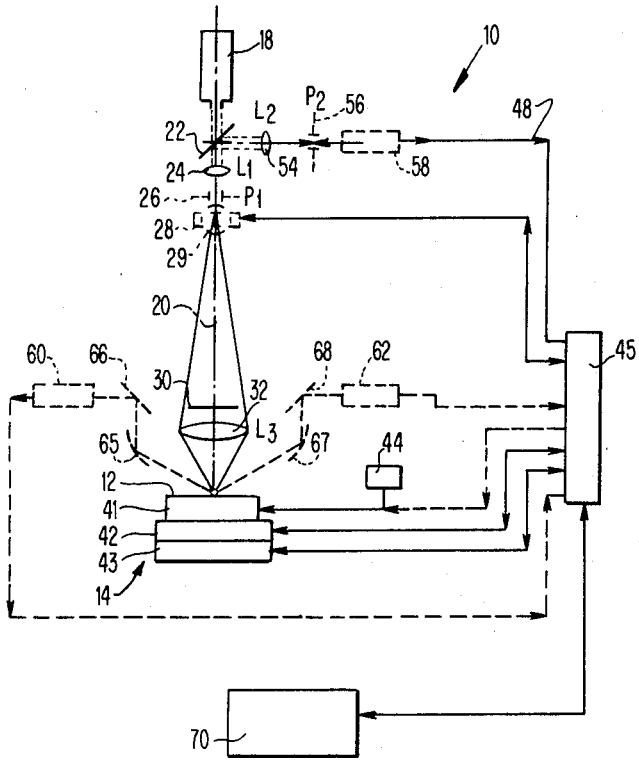

The file of this unexamined application may be inspected and copies thereof may be purchased (849 O.G. 1221, Apr. 9, 1968).